(12) United States Patent
Legré et al.

(10) Patent No.: US 11,411,723 B2
(45) Date of Patent: Aug. 9, 2022

(54) APPARATUS AND METHOD FOR QUANTUM ENHANCED PHYSICAL LAYER SECURITY

(71) Applicant: ID QUANTIQUE SA, Carouge (CH)

(72) Inventors: Matthieu Legré, Veigy-Foncenex (FR); Bruno Huttner, Yverdon-les-Bains (CH)

(73) Assignee: ID QUANTIQUE SA, Carouge (CH)

( * ) Notice: Subject to any disclaimer, the term of this patent is extended or adjusted under 35 U.S.C. 154(b) by 492 days.

(21) Appl. No.: 16/469,338

(22) PCT Filed: Dec. 5, 2017

(86) PCT No.: PCT/EP2017/081459
§ 371 (c)(1),
(2) Date: Jun. 13, 2019

(87) PCT Pub. No.: WO2018/108619
PCT Pub. Date: Jun. 21, 2018

(65) Prior Publication Data
US 2020/0059358 A1    Feb. 20, 2020

(51) Int. Cl.
| | |
|---|---|
| *H04B 10/00* | (2013.01) |
| *H04L 9/08* | (2006.01) |
| *G06N 10/00* | (2022.01) |
| *H04B 10/70* | (2013.01) |
| *H04B 10/85* | (2013.01) |
| *H04J 14/00* | (2006.01) |

(52) U.S. Cl.
CPC .......... *H04L 9/0858* (2013.01); *G06N 10/00* (2019.01); *H04B 10/70* (2013.01); *H04B 10/85* (2013.01)

(58) Field of Classification Search
CPC .................................................. H04B 10/70
See application file for complete search history.

(56) References Cited

U.S. PATENT DOCUMENTS

| | | |
|---|---|---|
| 2005/0190921 A1 | 9/2005 | Schlafer |
| 2013/0016835 A1* | 1/2013 | Zbinden ............. H04L 9/0852 380/255 |
| 2013/0315395 A1 | 11/2013 | Jacobs |
| 2016/0028541 A1 | 1/2016 | Wilkinson |

\* cited by examiner

*Primary Examiner* — Daniel G Dobson
(74) *Attorney, Agent, or Firm* — Thomas Coester Intellectual Property (57) ABSTRACT

Free-Space key distribution method comprising exchanging information between an emitter (100) and a receiver (200) based on the physical layer wiretap channel model, comprising the steps of randomly preparing (710), at the emitter (100), one qubit encoded with one of two possible non-identical quantum states, sending (720) the encoded qubit to the receiver (200) through a physical layer quantum-enhanced wiretap channel (500), such that an eavesdropper (300) tapping said channel is provided with partial information about the said states only, detecting and measuring (730) the received quantum states, key sifting (740) between the emitter and the receiver through a classical channel, calculating (750, 760) an amount of information available to any eavesdropper (300) based on the detected and received quantum states.

13 Claims, 5 Drawing Sheets

APPARATUS AND METHOD FOR QUANTUM ENHANCED PHYSICAL LAYER SECURITY

TECHNICAL FIELD

The present invention relates to free-space optical communication and more particularly to the security of communications using free-space optical quantum channels and a method related thereto.

BACKGROUND ART

Free-Space Optical communication (FSO) is an optical communication technology that uses light propagating in free space to wirelessly transmit data for telecommunications or computer networking. "Free space" means air, outer space, vacuum, or something similar, where the light propagates in a straight line. This contrasts with guided optics, such as optical fibers or more generally optical waveguides, where light is guided and directed by the waveguide. Free-space technology is useful where the physical connections are impractical due to high costs or other considerations.

Like any other type of communications, free-space optical communications requires security to prevent eavesdropping. When one looks into the different security means of Free-Space Optical communications, one can see that several solutions have been investigated in order to provide a solution enabling an emitter and a receiver to share secret information through FSO. Common ones are based on the exchange of secret keys through FSO channels. After their exchange, those keys are used to exchange messages in a secure way (e.g. by means of encryption).

Figure 1:
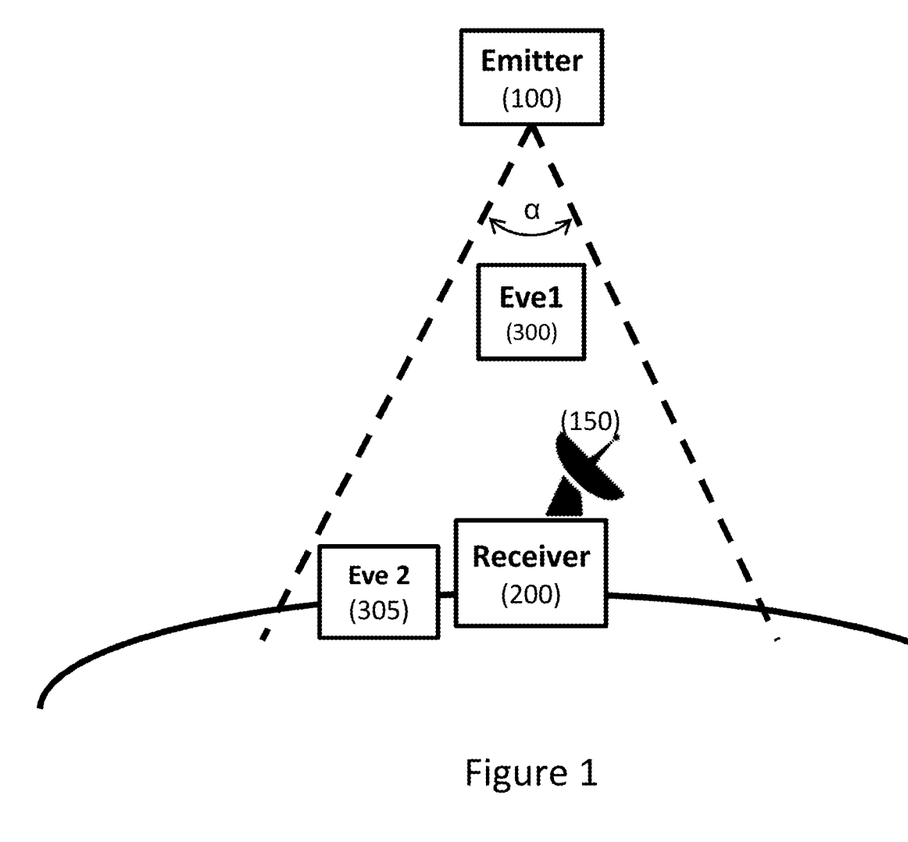
FIG. 1 represents the different eavesdropping scenarios, with wiretap channel and physical layer wiretap channel eavesdropping.

Usually, in FSO key exchange, two eavesdropping scenarios can be considered. Both are illustrated in FIG. 1.

In the first scenario, Eve1 300 is located on the optical path between the emitter 100 and the receiver 200; therefore Eve1 300 can intercept the optical signal and resend a potentially modified optical signal to the receiver 200. This will be referred to as the active scenario. In the second scenario Eve2 305 is limited to the ability of extracting a fraction of the optical signal transmitted from the emitter 100 to the receiver 200. In this scenario, the eavesdropper (Eve2 305) cannot resend any optical signal to the receiver 200. This will be referred to as the passive scenario. Note that the distinction between active and passive scenarios, which restricts the activity of the eavesdropper, can only be made at the physical layer level. A communication channel in the passive scenario is known as a wiretap channel, first introduced by Wyner. However, the concept of a wiretap channel was later extended, at a more abstract level by Czisar and Korner. In their case, the wiretap channel is an abstract model, which includes any tripartite channel (with an Emitter, a Receiver and an Eavesdropper), with no restriction on the eavesdropper. In this abstract model, the wiretap channel comprises two separate channels, one between Emitter and Receiver, and one between Emitter and Eve. This model was again extended to a quantum wiretap channel, where the communication channels transmit quantum states (refs: Igor Devetak, Quantum privacy and quantum wiretap channels, Cai, N., Winter, A. & Yeung, R. W., Quantum Information: An Introduction Par Masahito Hayashi). Both these models, being at an abstract level, do not make any assumption on the abilities of Eve, and therefore cover both the passive and active scenarios. In the following, as our goal is to differentiate between active and passive scenarios, we will adopt the original Wyner terminology where a wiretap channel is a physical communication channel, which restricts the ability of Eve to passive eavesdropping.

During last decades, solutions have been developed in order to overcome eavesdropping in both scenarios.

QKD is a protocol that allows the exchange of secret keys in the active scenario. In a QKD protocol, the communication channel between the two users is known as a quantum channel. A quantum channel is a communication channel, which transmits quantum particles, typically photons, in a way that conserves their quantum characteristics. There are two sets of parameters, which are used for quantum encoding. One is the polarization of the photons, and the second is the phase, which requires the use of interferometers. Both have their advantages and drawbacks depending on the physical layer of the quantum channel and the type of QKD protocol.

The basic idea behind QKD is that the eavesdropper is allowed to intercept the signal and process it in any way compatible with quantum mechanics. Nevertheless, the legal users, known as Emitter and Receiver, can still exchange a secure key.

The most well-known protocol for QKD is the BB84 protocol, based on four distinct quantum states, explained in Bennett & Brassard, 1984. Several other protocols have been invented, such as for example:

E91, based on entanglement;

B92 based on only two quantum states, but which require interferometric detection;

and COW, which uses a variant of the phase parameter, and uses time-of-detection for encoding.

All these protocols are based on the transmission of single photons through the quantum channel, and are known as Discrete Variable QKD or DV-QKD. They require the use of single-photon detectors on Receiver's side. In order to alleviate this need, another type of QKLD, named Continuous Variable QKD, or CV-QKD have been suggested and demonstrated. CV-QKD is typically used with the phase parameters.

Commercial systems for ground QKD, distributed over an optical fiber, have been developed, inter alia by ID Quantique. In all practical implementations of ground QKD, the parameter used for quantum encoding is the phase, or a related timing parameter for the COW protocol. The reason is that, as polarization is not conserved in an optical fiber, polarization schemes require complicated and expensive components. On the other hand, interferometric detection is easier to realize in single-mode optical fibers, which is the medium of choice for ground QKD.

One of the most restrictive limitations of ground QKD is the distance limitation. Due to unavoidable loss in the optical waveguide and the fact that optical amplifiers cannot be used in a quantum channel, the distance between Emitter and Receiver is limited to about hundred kilometers in a commercial setup and up to three hundred kilometers in an academic experiment. Therefore, in order to increase the distance range, FSO QKD, where the quantum channel is free space, which does not have the same loss limitation, has been suggested.

Recently, FSO QKD has been investigated in order to securely exchange a key between an emitter and a receiver in free space, typically between a satellite or a flying drone and a ground-based station. As an example, U.S. Pat. No. 9,306,740 discloses an apparatus for a QKD telescope; US20100166187 discloses a system performing QKD using High-Altitude Platforms. Also several research works have been done showing how atmospheric continuous-variable QKD may be performed (Heim &al., 2014) or demonstrating the feasibility of free space QKD (Elser &al., 2009).

Even though the principle of FSO QKD has been demonstrated on academic set-ups, it is still a challenging demonstration. In contrast to ground QKD, phase is more difficult to use in free space. Indeed, due to atmospheric distortions, the wave front of the wave is distorted during propagation, which leads to poor interference at the receiver. It is possible to improve this by using adaptive optics mirrors. However, this greatly increases the cost and complexity of a system. In free space, polarization is conserved, which makes polarization-based systems more appealing. However, because of the movement of the receiver with respect to the transmitter, the polarization of the photons is changing during the passage of the satellite, which requires complicated polarization compensating components. Therefore, each of the possible protocols and schemes mentioned above have some serious drawbacks, which make their implementation challenging:

- BB84, typically based on polarization in free space, requires generation, compensation and tracking of four different polarization states;
- E91, which can be based on polarization or phase, needs a complicated source of entangled particles;
- B92, which only needs two different states, cannot be implemented with polarization alone, and needs interferometric detection, which is not straightforward in free-space applications;
- COW protocol does require interferometric detection for the eavesdropper as above;
- CV-QKD systems also rely on phase, and require interferometric detection.

Another difficulty with FSO QKD, not present for ground QKD, where the channel is entirely within the optical waveguide, with little influence and the external world, is the existence of stray light. Indeed, isolating the free space channel from external light is a challenging task, especially for high loss channels, such as the 800 km-long channel for Low Earth Orbit satellite. Therefore, it would be advantageous to be able to keep the security of the key exchange while increasing the power level of the communication channel above the one required for QKD systems. One should note that in the case of QKD systems, the parameter, which is used to determine if the channel has a signal to noise ratio good enough, is called quantum bit error rate (QBER). This parameter is somehow the inverse of the signal to noise ratio. The QBER value is measured by QKD systems. When the QBER value is above a predefined threshold value, the QKD system cannot generate any secret keys from the qubit exchange. The higher the QBER value, the larger the error rate with respect to the signal rate. An increase of the error rate can be due either to a decrease of the quantum signal, or to a modification of some QKD system parameters (for example a temperature system fluctuation that modifies the alignments of the optical system, or a change of the intrinsic noise of the single photon detectors in the QKD receiver) or to an eavesdropping attempt.

Having this background in mind, current existing solutions for FSO QKD face many technical issues and limitations. In order to achieve a simpler, less expensive, secure transmission system, the physical layer (classical or quantum) wiretap channel model, which restricts the abilities of the eavesdropper is of interest. In this model, it is necessary to trust that the eavesdropper cannot directly intercept the transmission. This is a reasonable hypothesis in free space, where transmitter and receiver are in a line-of-sight.

As an example, in order to prevent an eavesdropping according to the first scenario, radars 150 have been developed and used in order to detect the intrusion of an eavesdropper in an area covering the optical channel between an emitter 100 and a receiver 200. Moreover still as per the first scenario, it is really difficult for an eavesdropper Eve1 to be fully aligned with the emitter 100 and receiver 200, i.e. right in the path joining the emitter 100 and the receiver 200, because the emitter 100 and Eve1 should have the same velocity and same direction thus being on the same orbit. Finally, in order to intercept and resend the beams, the eavesdropper would need to have two different telescopes, one pointing to the transmitter and one pointing to the receiver, both with good enough accuracy to keep the optical systems locked.

Therefore, it is quite realistic to consider that the first scenario, where the eavesdropper is physically between the emitter and the receiver is likely not to happen, and even if it would happen one could detect it thanks to the use of radars. The physical layer wiretap channel scenario represents the one that fits the conditions of most FSO communications eavesdropping situations.

The physical layer wiretap channel is part of a research stream which is dedicated to Physical Layer Security. Physical layer security has recently become an emerging technique to complement and significantly improve the communication security of wireless networks. Compared to algorithmic cryptographic approaches, physical layer security is a fundamentally different paradigm where secrecy is achieved by exploiting the physical layer properties of the communication system, such as thermal noise, interference, and the time-varying nature of fading channels.

In the physical layer wiretap channel model represented in FIG. 1, the goal of the legitimate users, i.e. the emitter 100 and the receiver 200, is to communicate over a main channel, while ensuring that an eavesdropper Eve2 305 is unable to obtain any information about the exchanged information from the outputs of the wiretapped channel, or at least cannot extract signal enabling to get access to the information. The fundamental theoretical framework underlying this case was laid by Wyner. The main assumption is that if the channel from the emitter to the eavesdropper is a degraded version of the channel sent from the emitter to the legitimate receiver, a non-zero secrecy rate may be achieved by sacrificing a fraction of the message rate. "Degraded" in that case should be understood as noisier. More recently, the Wyner physical layer wiretap channel was revisited by Maurer and Wolf, who showed that, even if the eavesdropping channel is not a degraded version, i.e. if Eve has less noise than Emitter and Receiver, a non-zero secrecy rate could still be achieved, with only assumptions on noise independence between Eve and Receiver. In order to derive secret information, Emitter and Receiver have to know the noise on the eavesdropping channel.

On the perspective of this scenario, there have been many theoretical recent studies (Lopez-Martinez & al., 2015), (Wang & al., 2014), (Sun, 2016) and (Sasaki & al., 2016) analyzing the effect of noise on a signal extracted by an eavesdropper with set-up exploiting optical classical signals with optical signal intensity in the range of 100 mW.

Therefore, with some assumptions on Eve2 305 noise channel and its capacity for signal extraction, it is possible to enable an emitter and a receiver to exchange information, for example keys, in a secure way through an FSO channel.

However, this technique requires assumptions on Eve2 305's noise level and signal extraction capacity. The noise on Eve's detector has to be lower bounded, and the bound has to be known. This is quite problematic because, one can never be sure of what quality of detectors Eve2 is provided with.

There is therefore an urgent need for a system and a method, which provides secure FSO communications with respect to the physical layer wiretap channel scenario and which does not rely on technological limitation on the eavesdropper.

It is therefore an object of the invention to provide system and a method which provides secure FSO communications which does not rely on technological limitation on the eavesdropper.

SUMMARY OF THE INVENTION

This object is achieved by combining the physical layer wiretap channel hypothesis (the eavesdropper is limited to listening) and the use of a simple quantum channel, which will limit the amount of information available to Eve, through the principles of quantum mechanics. This type of communication channel will be referred to as a quantum-enhanced wiretap channel.

The proposed invention provides a system and a method enabling the exchange a secure key, in the context of the physical layer wiretap channel scenario, through FSO communications without any assumption on Eve capacity to extract data from the optical channel between an emitter and a receiver and without complex and expensive implementations that are required for QKD-based systems. The specification below describes in detail the apparatus and method used.

The disclosed invention is a method for free-space key distribution based on the wiretap channel model, where the channel transmits quantum states, so that the information, which can be extracted by an eavesdropper, is bounded by quantum mechanics principles.

More particularly, the invention system and method are based on:
- an emitter having the capacity to randomly encode two quantum states and send them to a receiver. According to specific embodiments of the invention these states may be single photons or weak coherent states, with only a few photons. Encoding can be done with polarization, time-bins or other parameters. Although we present only a few embodiments, other types of quantum states and encoding may be used as well.
- a physical layer quantum-enhanced wiretap channel, which transmits the states toward the receiver. The wiretap channel hypothesis is that an eavesdropper can collect part of the quantum state, but cannot intercept them. The main characteristic of the quantum channel, which is used as a basis of the invention, is that tapping the channel only provides the eavesdropper with partial information about the states. In contrast, in a classical channel, tapping can provide in principle perfect information about the signal.
- a receiver, which has the capacity to detect and measure the quantum states sent by the emitter.

In addition, the emitter and receiver are able to collaborate over an authenticated classical channel, in order to extract a shared secure key from the original transaction. This step is defined as key distillation, and comprises: reconciliation, which identify and discards the states, which were lost in the transmission, error correction, which removes any errors, which may have arisen during the transmission; and privacy amplification, which reduces the information, which may have leaked to the eavesdropper to any chosen low value.

For this reason a first aspect of the invention relates to a free-space key distribution method comprising exchanging information between an emitter and a receiver based on the physical layer wiretap channel model, comprising the steps of randomly preparing, at the emitter, one qubit encoded with one of two possible non-identical quantum states, sending the encoded qubit to the receiver through a physical layer quantum-enhanced wiretap channel, such that an eavesdropper tapping said channel is provided with partial information about the said states only, detecting and measuring the received quantum states, key sifting between the emitter and the receiver through a classical channel, calculating an amount of information available to any eavesdropper based on the detected and received quantum states.

Advantageously, the two possible non-identical quantum states are composed of single photons.

Preferably, each single photon is detected by through USD measurement and will be taken for a secret key generation step.

Alternatively, said two possible non-identical quantum states are composed of coherent states of multiple photons.

According to a preferred embodiment of the invention, the free-space key distribution method comprises a further eavesdropper accessible information determining step first defining a collection zone $S_{CZ}$ corresponding to the surface of the receiver, a secure zone $S_{SZ}$ corresponding to a zone where the Receiver may assume that no eavesdropper may have access to the signal transmitted through the optical quantum channel, an illumination zone $S_{IZ}$ corresponding to the total area covered by the optical beam and an Insecure Zone $S_{Insecure\ Zone}$ where an eavesdropper may be located and wherein the mean number of quantum state accessible to an eavesdropper is bounded by the following formula:

$$\bar{n}_{Eve} = \frac{S_{Insecure\ Zone}}{S_{IZ}} \times t_{QC} \times \bar{n}_{Emitter}$$

wherein
$\bar{n}_{Eve}$ is the mean number of photons potentially intercepted by an Eavesdropper,
$t_{QC}$—is the quantum channel transmission coefficient, and
$\bar{n}_{Emitter}$ is the mean number of photon emitted.

Advantageously, the free-space key distribution method further comprises an illumination zone surface bounding step based on the probability that an eavesdropper collects at least one photon for each coherent state sent by emitter, said probability given by the following formula:

$$p_{Eve\ collects\ at\ least\ one\ photon} = 1 - p_{Eve\ collects\ zero\ photon} = 1 - e^{-\bar{n}_{Eve}}$$

wherein the said illumination zone bounding step is defined by adjusting the intensity of the coherent states emitted by Emitter.

According to a preferred embodiment of the invention, the calculating step is an error correction step carried out by distillation engines of the emitter and the receiver.

Advantageously, the key sifting comprises a distillation engine announcing to a distillation engine detection timeslots and exclude timeslots where no quantum state has been detected.

Preferably, the two possible non identical quantum states are non-orthogonal.

According to a preferred embodiment of the invention, the error correction step is followed by a privacy amplification step generating a common secret key between the emitter and the receiver by trashing the bits that have been revealed during the error correction step.

Advantageously, the free-Space key distribution method further comprises a synchronizing step prior to the qubit preparing step.

A second aspect of the invention relates to a free-space key distribution system adapted to carry out the method of the first aspect of the invention, characterized in that it comprises an emitter, a receiver and an optical quantum channel linking said emitter and said receiver, wherein the emitter comprises a quantum state emitter and a distillation engine and the receiver comprises a quantum state receiver and a distillation engine.

According to a preferred embodiment of the invention, the quantum state emitter comprises a random number generator a state encoder device, where the random number generator outputs a value commanding the state encoder device to encode the quantum state as one of the two non-identical quantum states Advantageously, the quantum state is a photon polarization.

Preferably, the quantum state receiver comprises a quantum state detection device is an USD device adapted to operate an Unambiguous Sate Discrimination measurement adapted to generate a sequence of bits representing a receiver raw key.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

FIG. 1, as mentioned and described above, presents various eavesdropping scenarios. An emitter 100 and a receiver 200 exchange data through a FSO communication channel, defined by the dashed lines, wherein an eavesdropper Eve1 300 may be located between 100 and 200, and intercepts and resend the beam, according to the wiretap channel scenario, or an eavesdropper Eve2 305 may be located on the ground and can only collect part of beam without resending it, according to the physical layer wiretap channel scenario, both attempting at gaining information on the exchanged data. Its description will not be repeated here in detail.

Figure 2:
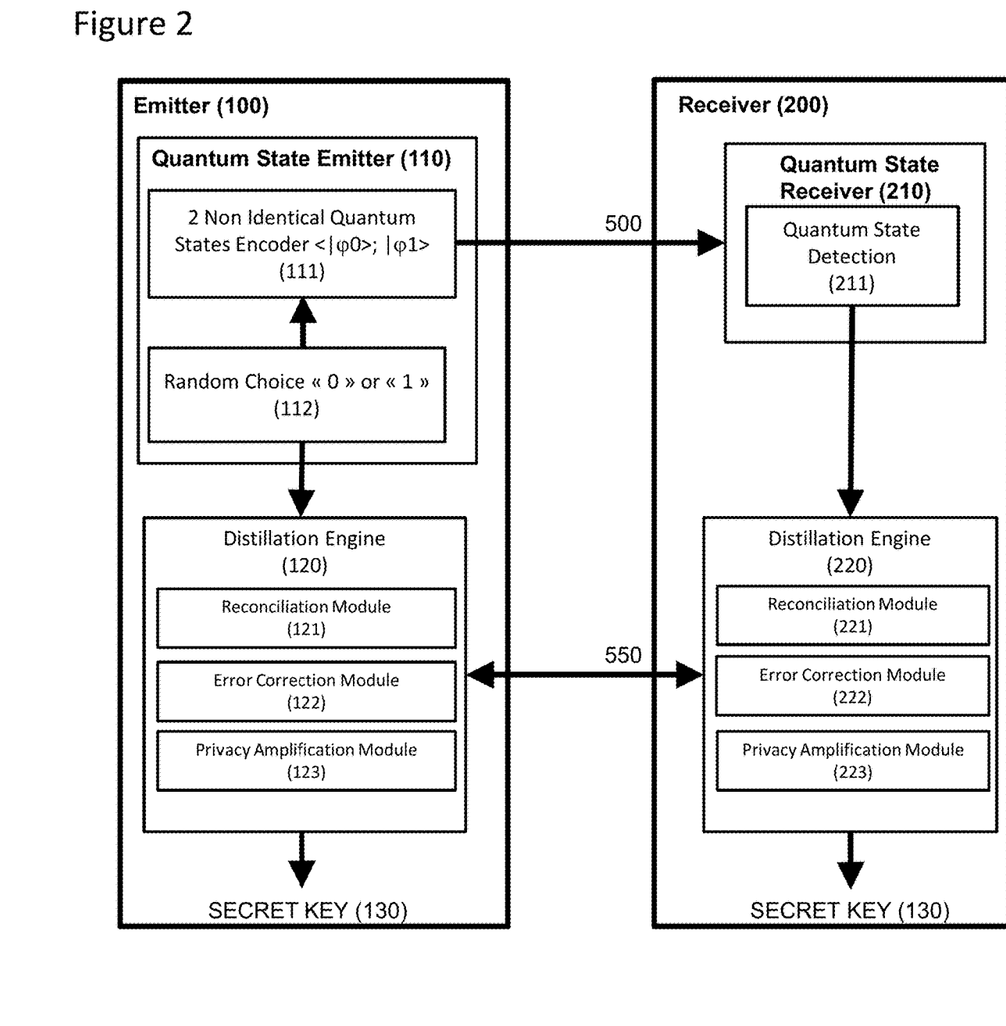
FIG. 2 represents the general apparatus of the present invention.

FIG. 2 represents the general apparatus of the invention comprising an emitter 100 and a receiver 200 exchanging quantum states through a quantum channel 500 and authenticated signals through a classical channel 550. Note that channels are considered as wiretapped, i.e. eavesdroppers can extract information and/or quantum states that go through them, but cannot modify this information and these quantum states. Classical signals may be classical RF signals or optical signals exchanged between the emitter 100 and receiver 200 for synchronization, pointing and tracking or post-processing operation. The emitter 100 comprises a quantum state emitter 110 and a distillation engine 120. The quantum state emitter 110 is composed of a source of quantum states $|\varphi_0\rangle$ and $|\varphi_1\rangle$ 111, representing the bits 0 and 1 respectively, where, for example the quantum state may be a polarization state carried by a single photon, and a module able to generate random bit values 112 that may be, for example, made with a conventional RNG or a Quantum RNG.

Depending on the bit value outputted by the random bit value generator 112 (0 or 1), the source 111 is adapted to emit the corresponding quantum state (e.g. '0'=$|\varphi_0\rangle$; '1'=$|\varphi_1\rangle$). A copy of the bit value chosen by generator 112 is sent to a distillation engine 120 in order to compose the raw key of the emitter. The distillation Engine 120 is adapted to carry out the key distillation process in order to generate a secret key from the raw key.

On the other side, the receiver 200 comprises a quantum state receiver 210 and a similar distillation engine 220. The quantum state receiver 210 is able to detect the quantum states received over 500 and to discriminate between the two non-identical states $|\varphi_0\rangle$ and $|\varphi_1\rangle$. The distillation engine 220 is used in conjunction with 120 over the classical channel 550 to distill a secret key from the raw exchange. The measurement sequence outputs composed of '1' and '0' are sent to distillation engine 220 in order to compose the raw key of the receiver.

Distillation Engines 120 and 220 collaborate through classical channel 500 to generate of a secret key 130. Both distillation engines 120 and 220 are composed of three modules: a reconciliation module 121 and 221, an error correction module 122 and 222 and a privacy amplification module 123 and 223. Both distillation engines 120 and 220 can be made of processing units. The three modules composing the distillation engine 120 or 220 can consist of software pieces running on their processing unit.

In case of time-bin detection, the reconciliation module 221 first announces to the reconciliation module 121 the detection timeslots and excludes timeslots where no quantum state has been detected. Indeed, due to possible loss in quantum channel 500, and at the detector in 210, not all states sent by 111 are detected. A typical loss of the Free-Space Quantum Channel 500 is in the range of 10 to 20 dB for a High-Altitude Platform, 30 to 50 dB for a satellite and more than 50 dB for a geostationary satellite.

Then, the error correction modules 122 and 222 perform an error correction on the remaining bits. Error correction consists in evaluating the number of errors, for example by taking a sample of bits (and later discarding them to avoid leaking information), and using an error correction code to reduce the number of errors to zero.

Lastly, the privacy amplification modules, 123 and 223 estimate the amount of information, which may have leaked to the eavesdropper, and reduce it to any chosen value, typically close to zero, at the cost of reducing further the number of remaining bits. The exact calculations depend on the embodiment, and are exemplified below for two cases: single photons and coherent states. Other embodiments can be estimated in a similar manner. At the end of this procedure, the transmitter 100 and the receiver 200 share a secret key 130, as required.

Figure 3A:
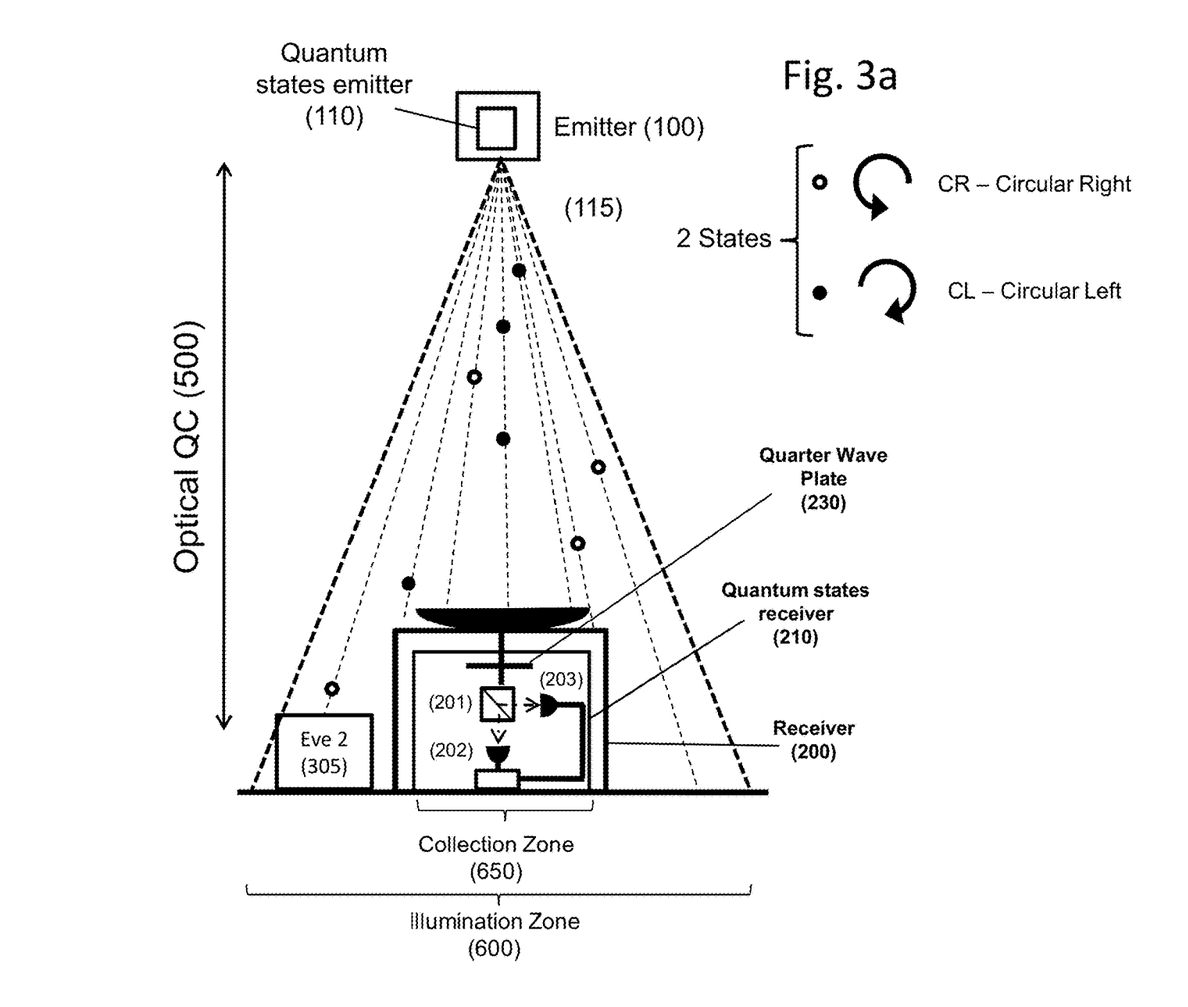
FIG. 3a represents a preferred embodiment of the present invention, suitable for the case of polarization states carried by single photons.

FIG. 3a represents a first implementation option of the invention based on single photon states and allowing secure key exchange between a flying platform and a ground station. In this first embodiment, quantum state emitter 110 emits series of single photons states, each of which is in one of the two states, say $|\varphi_0\rangle$ and $|\varphi_1\rangle$ (corresponding to bit values of 0 and 1), for example with orthogonal polarizations. In order to prevent the drawback explained in the Prior Art, namely that the polarization may change according to the position of the emitter during the flight, one can for example use the two circular polarization modes 115: circular right and circular left polarizations, which are invariant with respect to the position of the flying platform. This series of states is represented by the bundle of arrows, each large dot corresponding to one photon, emitted at different times. The photons are all within the diffraction cone of the emitter 110, and will arrive on the ground at different locations. The photons arriving in a collection zone 650 also named Receiver Area 200 (see FIG. 3b) will be detected by Receiver 200 (with loss due to imperfect detection). These states can easily be discriminated at receiver 200, with a Quantum state receiver 210 composed of a Quarter Wave Plate (QWP), which transforms the two circular polarizations into two linear polarizations, a polarization beam splitter 201, which separates the two linear polarizations, and sends each of them to one of the two detectors 202 and 203.

It is well known from the principles of quantum mechanics that single photons states cannot be split. Therefore, any photon arriving outside the collection zone 650, may therefore be detected by Eve2 305 and will not be received at the receiver 200. The corresponding states will be discarded during the reconciliation protocol explained above. The information shared between the emitter 110 and the receiver 200, and which is available to Eve2 305 in this embodiment is therefore zero. In the physical layer quantum-enhanced wiretap model with single photons, the privacy amplification step is therefore only necessary to trash the bits that have been revealed during the error correction step. The corrected key without the bits revealed during the error correction step is already secret. Unfortunately, generating streams of single photons is a difficult task. It has been realized in laboratories, but there is no commercial source readily available. A major effort would also be needed in order to space-qualify such a source. Therefore, although this embodiment represents the simplest implementation, it is not yet practical.

Figure 3B:
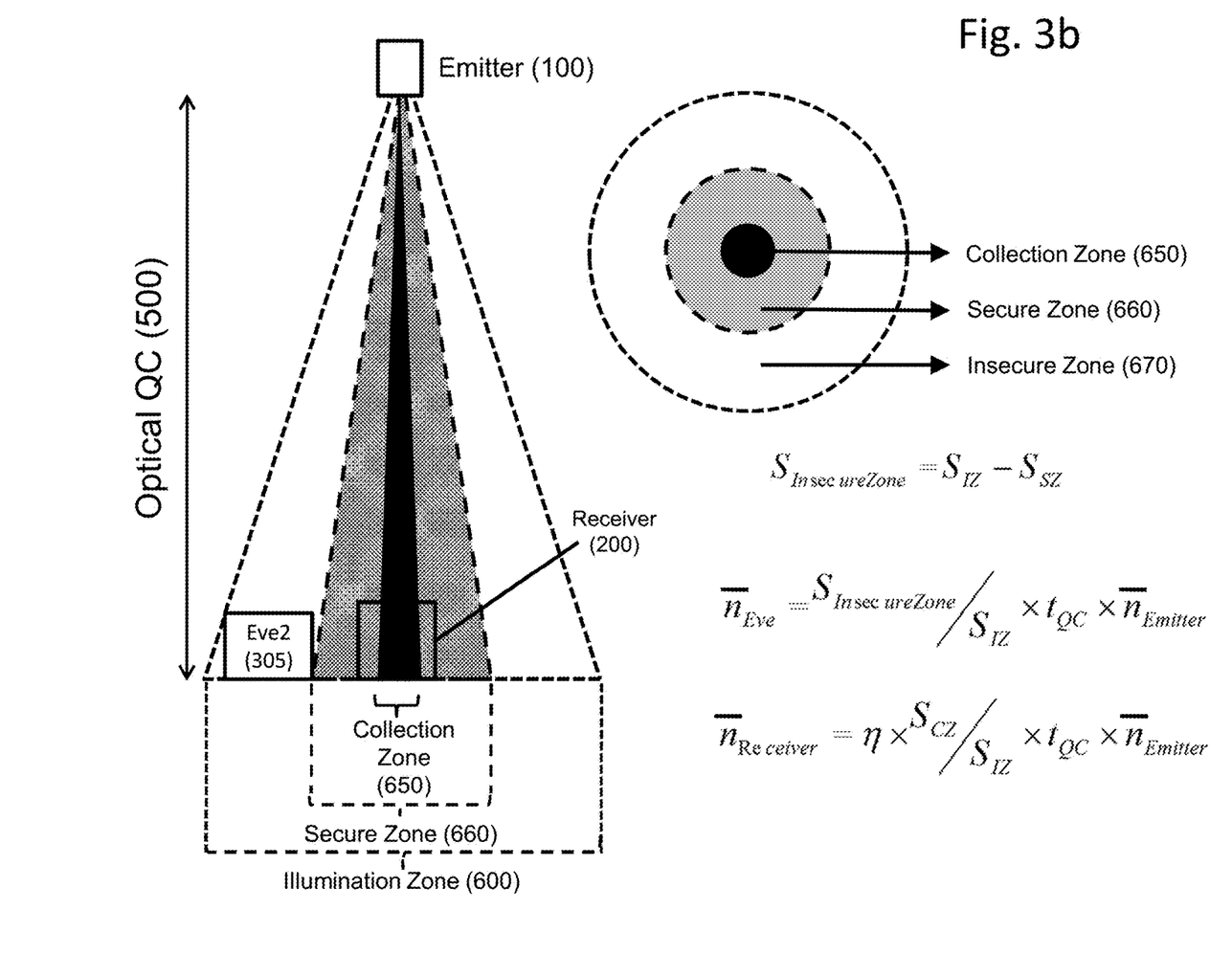
FIG. 3b represents a preferred embodiment of the present invention, suitable for the case of coherent states.

In our second embodiment, the two quantum states are coherent states. In Quantum Optics, coherent states were initially introduced by R. Glauber and have been extensively studied (see for example the book: Quantum Theory of Light by R. Loudon). Their most important feature is that coherent states are the quantum states emitted by a laser, for example in optical pulses. The second feature of coherent states, which will be used in this embodiment, is that coherent states remain coherent states when attenuated, for example during transmission through the atmosphere. The third feature of coherent states, which will also be used in this embodiment, is that coherent states can be decomposed into direct products of independent coherent states. This means that when a coherent state is split into different modes, the probability of detection of the photons in each of the modes is independent. FIG. 3b represents this specific invention embodiment and a typical key exchange implementation. It represents the configuration where a satellite wants to exchange a secret key with a ground station. Eve2 305, the eavesdropper, is supposed to be located on the ground close to receiver 200. It can collect part of the quantum states sent by emitter 100 when it is in the optical beam. This presented configuration matches the hypothesis of the physical layer wiretap channel scenario since Eve2 305 has only the capacity to collect a portion of the signals propagating in the optical communication channel between emitter 100 in the satellite and receiver 200 in the ground station. The emitter 100 sends coherent states (e.g. optical pulses emitted by a laser) to the receiver 200 through an optical quantum channel 500. The intensity of the pulses is chosen to have very low intensities at the receiver, of the order of one photon on average. Emitter 100 might for example choose to work with quantum states that are encoded in time, i.e. each bit corresponding to a different time-bin like the main basis used in COW protocol. A polarization encoding (as described in the previous embodiment) would also be possible. However polarization encoding requires polarization-conserving components, for example in the optical mirrors, which make the whole system more expensive. For practical reasons, time encoding therefore seems to be a cheaper solution because its implementation requires a pulsed laser only. This pulsed laser is active at the proper time in order to generate the two following quantum states: either one weak optical pulse in the early time-bin followed by a vacuum state in the late time-bin to represent, say a zero, or one vacuum state in the early time-bin followed by one weak optical pulse in the late time-bin, to represent, say a one. On receiver 200 side, the distinction between those two quantum states can be performed simply by checking if the photon detection occurred in the early or late time-bins. This can be implemented with a unique single photon detector followed by a device measuring the time of the detection compare to the time-bin definition. Proper synchronization of the detection system is also needed. Due to unavoidable diffraction effects, the beam from emitter 100 widens during propagation. Quantum Channel 500 is therefore represented by the conical optical beam. This effect is very much emphasized in FIG. 3b, for demonstration purposes. In reality the aperture of the beam, for example for a 10 cm mirror, is about 20 Arcsec, However, due to the long propagation distance, about 800 km for a Low Earth Orbit satellite, the beam illuminates a large area typically of several meters, referred to as the Illumination Zone (IZ) 600. We decompose IZ 600 into three zones, namely:

1—A Collection Zone (CZ) 650 corresponding to the surface of the mirror, which collects the light and is located within receiver 200. The mean number of photons accessible to receiver 200 is given by the following formula $$\bar{n}_{Receiver} = S_{CZ}/S_{IZ} \times t_{QC} - \eta_{Receiver} \times \bar{n}_{Emitter}$$

with:
$\bar{n}_{Receiver}$—The mean number of photons received by receiver 200
$t_{QC}$— Quantum Channel transmission coefficient
$\eta_{Receiver}$—The quantum efficiency of the Receiver
$\bar{n}_{Emitter}$—The mean number of photons sent by an Emitter 100
$S_{CZ}$—The surface of CZ 650
$S_{IZ}$—The surface of IZ 600, which represents the total area covered by the optical beam, and can be, for example, a circle of about 50 meters when a light beam emitted from a satellite impinges the surface of the Earth.

2—A Secure Zone (SZ), 660 where the Receiver 200 may assume that no eavesdropper may have access to the signal transmitted through the optical quantum channel 500, this zone may for example be a closed area surrounding the Receiver 200 where an eavesdropper may not enter, for example the closed park of a building.

3—A third zone is the Insecure Zone 670, which is illuminated but insecure and corresponds to where an eavesdropper may be located. The surface of the insecure zone is:

$$S_{InsecureZ} = S_{IZ} - S_{SZ}.$$

The mean number of photons accessible to Eve2 305 is therefore bounded by the following rule $$\bar{n}_{Eve} = \frac{S_{Insecure\ Zone}}{S_{IZ}} \times t_{QC} \times \bar{n}_{Emitter}$$

with:

$\bar{n}_{Eve}$—The mean number of photons potentially intercepted by an Eavesdropper (Eve2—305). Here, in order to calculate an upper bound on the information potentially available to Eve2 305, we assume that Eve can cover the whole of the Insecure Zone 670 with perfect detectors (what means assuming a quantum efficiency of one).

As mentioned previously, emitter 100 sends coherent states. These states can be decomposed into two different modes, corresponding to the two zones, Secure Zone 660 and Insecure Zone 670. The probabilities of detection in each of the zones are independent. This is a characteristic of the coherent states. In other words, the probability of detection of a photon by Eve2 305 is totally independent of the probability of detection at the Receiver 200.

Assuming that the channel from the Emitter 100 to Eve2 305 does not introduce any extra noise, and that Eve2 305 can perfectly separate between the states sent by the Emitter 100, Eve2 305 is able to know the state sent by the Emitter 100 (i.e. the bit value) received by receiver 200 each time her coherent state has at least one photon. Using the properties of the coherent states, the probability that Eve2 305 collects at least one photon for each coherent state sent by emitter 100 is given by the following formula:

$$p_{Eve\ collects\ at\ least\ one\ photon} = 1 - p_{Eve\ collects\ zero\ photon} = 1 - e^{-\bar{n}_{Eve}}$$

This formula gives us the information obtained by Eve2 305 on each quantum states sent by Emitter 100. From the independence property discussed above, this is also the information potentially obtained by Eve2 305 on each of the bits shared by Emitter 100 and Receiver 200 prior to error correction. In contrast to the previous embodiment with single photon states, where Eve2 305 could get no information, when Emitter 100 and Receiver 200 use coherent states, Eve2 305 can get partial information on the states. However, this information is bounded by the equation above. One common feature of the two embodiments is that the information potentially leaked to Eve2 is not dependent on the error rate in the channel, but only on the type of states used by the Emitter 100 and the geometry of the system. By reducing the intensity of the coherent states emitted by Emitter 100, the mean number of photons of the coherent state received by Eve2 305 gets closer to zero. Hence, its information on the bit value chosen by Emitter 100 is smaller when the intensity of the coherent states is weaker. In addition, when the secure zone 660 is large enough with respect to the illumination zone 600, the probability that Eve2 305 receives a photon is small. This shows that, in order to reduce the information potentially available to Eve2 305, one can use two different paths:

(1) either sends a restricted number of photons,
(2) or make sure that Eve cannot access most the beam, by having a large enough secure zone.

This information will be reduced to any required value by privacy amplification.

Figure 4:
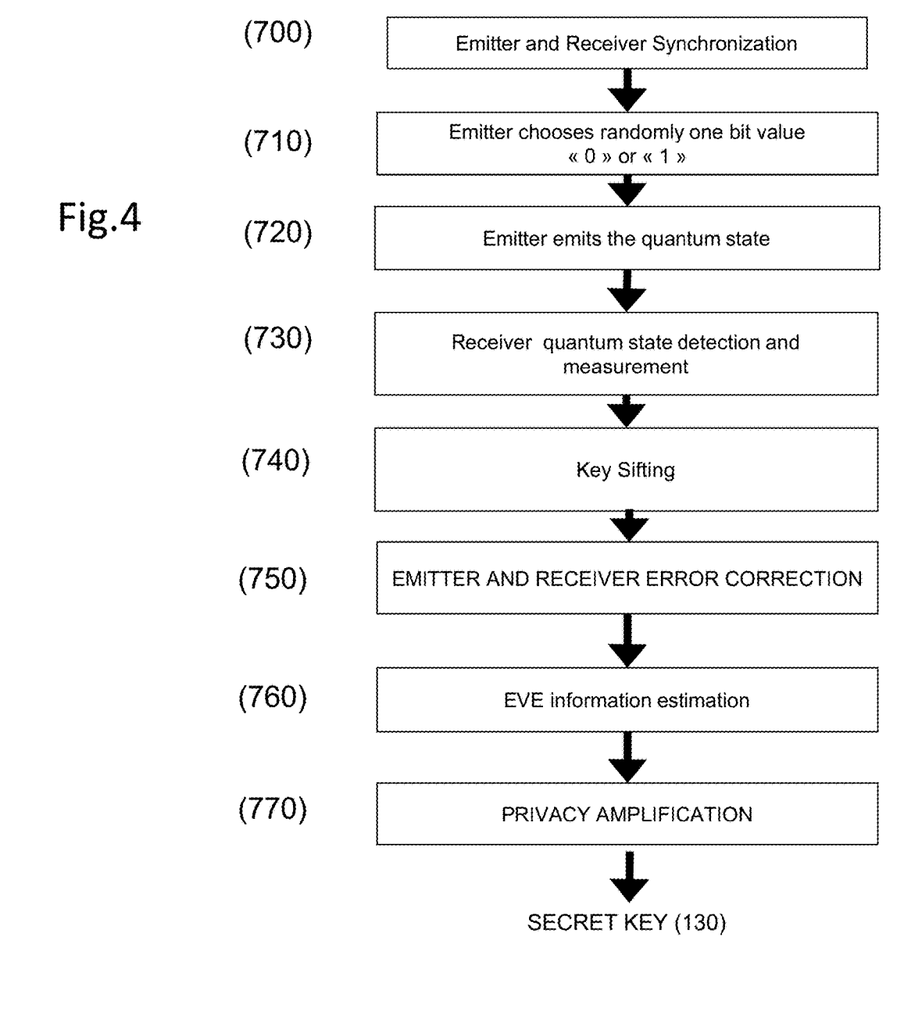
FIG. 4 represents the method associated to the general apparatus of the present invention.

FIG. 4 represents a method associated to the invention.

In a first step 700, the emitter 100 and the receiver 200 synchronize through channel 550 by operating a classical RF or optical signal exchange. This operation may be done for example through a Pointing and Tracking system for satellite systems but is optional.

In a second step 710, the Emitter 100 prepares randomly one qubit encoded on one of two possible non identical quantum states, said quantum state being composed either of single photon or coherent states. This random qubit value is added to the emitter's raw key.

In a third step 720 the emitter sends the encoded qubit, between two non-identical quantum states, corresponding to the chosen bit value, to the receiver 200.

In a fourth step 730 the receiver 200 detects and measures the quantum states and outputs a '1' or a '0'. Optionally, this measurement may be done through an Unambiguous State Discrimination measurement on the received states which outputs either '1', '0' or inconclusive result 'Ø'. The result is added to the receiver's raw key.

Then, in a key sifting step 740, the emitter and the receiver communicate such that the receiver announces the time slots of the detections to the emitter and the emitter erases from her raw key the bit values corresponding to not detected states.

In a fifth 750, the emitter 100 and the receiver 200 collaborate for error correction between their 2 raw keys.

In a sixth step 760, Emitter 100 and Receiver 200 evaluate the maximum information accessible to an Eavesdropper 305 having the capacity of extracting information from the optical quantum channel 500 through physical layer wiretapping based on the two non-identical quantum states emitted by the emitter as explained above.

In a final step 770, Emitter 100 and Receiver 200 perform a privacy amplification of the corrected raw key in order to generate a common secret key 130.

LIST OF REFERENCE SIGNS

100 Emitter
110 Quantum State Emitter
111 Quantum State Encoder
112 RNG
120 Emitter's Distillation Engine
121 Reconciliation module
122 Error correction module
123 Privacy amplification module
130 Secret Key
200 Receiver
210 Quantum State Receiver
211 Quantum states detection
220 Receiver's Distillation Engine
221 Reconciliation module
222 Error correction module
223 Privacy amplification module
300 Eve1
305 Eve2
500 Quantum Channel
550 Classical Channel
600 Illumination zone
650 Collection Zone
660 Secure Zone
670 Insecure Zone
700 Emitter and Receiver Synchronization
710 "0"/"1" random choice 720 Quantum State emission
730 Receiver Quantum State Measurement
740 Key Sifting
750 Emitter and Receiver Error Correction
760 Eve information estimation
770 Privacy Amplification

The invention claimed is:

1. Free-Space key distribution method comprising exchanging information between an emitter (100) and a receiver (200) based on the physical layer wiretap channel model, comprising the steps of
   randomly preparing (710), at the emitter (100), one qubit encoded with one of two possible non-identical quantum states,
   sending (720) the encoded qubit to the receiver (200) through a physical layer quantum-enhanced wiretap channel (500), such that an eavesdropper (300) tapping said channel is provided with partial information about the said states only,
   detecting and measuring (730) the received quantum states
   key sifting (740) between the emitter and the receiver through a classical channel,
   calculating (750, 760) an amount of information available to any eavesdropper (300) based on the detected and received quantum states, and
   wherein said two possible non-identical quantum states are composed of single photons such that any eavesdropper has no access to information exchanged between an emitter (100) and a receiver (200).

2. Free-Space key distribution method according to claim 1, characterized in that each single photon is detected by through USD measurement and will be taken for a secret key generation step (770).

3. Free-Space key distribution method according to claim 1, characterized in that the calculating step (750) is an error correction step carried out by distillation engines (120, 220) of the emitter (100) and the receiver (200).

4. Free-Space key distribution method according to claim 1, characterized in that the key sifting (740) comprises a distillation engine (220) announcing to a distillation engine (120) detection timeslots and exclude timeslots where no quantum state has been detected.

5. Free-Space key distribution method according to claim 1, characterized in that said two possible non identical quantum states are non-orthogonal.

6. Free-Space key distribution method according to claim 1, characterized in that the error correction step (750) is followed by a privacy amplification step (760) generating a common secret key (130) between the emitter (100) and the receiver (200) by trashing the bits that have been revealed during the error correction step.

7. Free-Space key distribution method according to claim 1, characterized in that it further comprises a synchronizing step (700) prior to the qubit preparing step (710).

8. Free-Space key distribution system adapted to carry out the method of claim 1, characterized in that it comprises an emitter (100), a receiver (200) and an optical quantum channel (500) linking said emitter (100) and said receiver (200), wherein the emitter comprises a quantum state emitter (110) and a distillation engine (120) and the receiver comprises a quantum state receiver (210) and a distillation engine (220).

9. Free-Space key distribution system according to claim 8, characterized in that the quantum state emitter (110) comprises a random number generator (112) a state encoder device (111), where the random number generator (112) outputs a value commanding the state encoder device (111) to encode the quantum state as one of the two non-identical quantum states.

10. Free-Space key distribution system according to claim 8, characterized in that the quantum state is a photon polarization.

11. Free-Space key distribution system according to claim 8, characterized in that the quantum state receiver (210) comprises a quantum state detection device (211) is an USD device adapted to operate an Unambiguous Sate Discrimination measurement adapted to generate a sequence of bits representing a receiver raw key.

12. Free-Space key distribution method comprising exchanging information between an emitter (100) and a receiver (200) based on the physical layer wiretap channel model, comprising the steps of:
   randomly preparing (710), at the emitter (100), one qubit encoded with one of two possible non-identical quantum states,
   sending (720) the encoded qubit to the receiver (200) through a physical layer quantum-enhanced wiretap channel (500), such that an eavesdropper (300) tapping said channel is provided with partial information about the said states only,
   detecting and measuring (730) the received quantum states
   key shifting (740) between the emitter and the receiver through a classical channel,
   calculating (750, 760) an amount of information available to any eavesdropper (300) based on the detected and received quantum states,
   wherein said two possible non-identical quantum states are composed of coherent states of multiple photons, and
   wherein the process comprises a further eavesdropper accessible information determining step first defining a collection zone $S_{CZ}$ (650) corresponding to the surface of the receiver (200), a secure zone $S_{SZ}$ (400) corresponding to a zone where the Receiver (200) may assume that no eavesdropper may have access to the signal transmitted through the optical quantum channel (500), an illumination zone $S_{IZ}$ (600) corresponding to the total area covered by the optical beam and an Insecure Zone $S_{Insecure\ Zone}$ (670) where an eavesdropper may be located and wherein the mean number of quantum state accessible to an eavesdropper is bounded by the following formula:

$$\bar{n}_{Eve} = \frac{S_{Insecure\ Zone}}{S_{IZ}} \times t_{QC} \times \bar{n}_{Emitter}$$

wherein
$\bar{n}_{Eve}$ is the mean number of photons potentially intercepted by an Eavesdropper,
$t_{QC}$—is the quantum channel transmission coefficient, and
$\bar{n}_{Emitter}$ is the mean number of photon emitted.

13. Free-Space key distribution method according to claim 12, characterized in that it further comprises an illumination zone (600) surface bounding step based on the probability that an eavesdropper (300) collects at least one photon for each coherent state sent by emitter (100), said probability given by the following formula:

$$p_{Eve}\text{ collects at least one photon} = 1 - p_{Eve\ collects\ zero\ photon} = 1 - e^{-\bar{n}_{Eve}}$$

In such a way that the information available to the Eavesdropper is bounded by $$\text{Information}_{Eve} = 1 - e^{-\bar{n}_{Eve}}$$

wherein the said illumination zone (600) bounding step is defined by adjusting the intensity of the coherent states emitted by Emitter (100).

\* \* \* \* \*